United States Patent [19]  
Vogt et al.

[11] 3,890,288  
[45] June 17, 1975

[54] PROCESS FOR MAKING POLY-ALPHA-OXYACRYLIC ACID AND ITS ALKALI METAL SALTS

[75] Inventors: Wilhelm Vogt, Hurth-Efferen; Edgar Fischer, Frankfurt am Main; Eberhard Auer, Erftstadt Liblar, all of Germany

[73] Assignee: Hoechst Aktiengesellschaft, Knapsack, near Cologne, Germany

[22] Filed: June 21, 1974

[21] Appl. No.: 481,814

[30] Foreign Application Priority Data
Sept. 15, 1973 Germany............................ 2346500

[52] U.S. Cl. ........ 260/80 P; 204/159.22; 260/80 R; 260/80 M
[51] Int. Cl. .............................................. C08f 3/44
[58] Field of Search.............. 260/80 M, 80 P, 80 R; 204/159.22

[56] References Cited
UNITED STATES PATENTS
3,352,771   11/1967   Anspon........................ 204/159.23

FOREIGN PATENTS OR APPLICATIONS
2,161,727   7/1972   Germany

*Primary Examiner*—Joseph L. Schofer
*Assistant Examiner*—Herbert J. Lilling
*Attorney, Agent, or Firm*—Connolly and Hutz

[57] ABSTRACT

Production of poly-α-oxyacrylic acid by contacting a solution of α-chloracrylic acid with one or more radical-yielding polymerization catalysts, heating and thereby hydrolyzing the resulting poly-α-chloracrylic acid in queous solution with the resultant precipitation of solid poly-α-oxyacrylic acid and separating the poly-α-oxyacrylic acid. More particularly, and aqueous α-chloracrylic acid solution is contacted with the radical-yielding polymerization catalysts for a period of at least 30 minutes and, while leaving the resulting poly-α-chloracrylic acid unseparated, it is heated for a period of at least 1 hour to temperatures within the range 80° and 110°C.

14 Claims, No Drawings

PROCESS FOR MAKING POLY-ALPHA-OXYACRYLIC ACID AND ITS ALKALI METAL SALTS

Poly-α-oxyacrylic acid or its alkali metal salts can be used as complex formers for calcium and magnesium ions. In addition to this, they are capable of inhibiting the precipitation of overstoechiometric proportions of calcium carbonate in an aqueous carbonate-containing solution, e.g., in hard water. This property is termed "power for sequestering lime". In view of these two properties, it has been suggested that poly-α-oxyacrylates be used as builders in detergent compositions (cf. German Patent Specifications "Offenlegungsschriften" 2 136 672 and 2 161 727).

C. S. Marvel et al. (J. Amer. Chem. Soc. 62 (1940), pages 3495 – 3498) were the first to produce poly-α-oxyacrylic acid and its alkali metal salts. As reported, a solution of α-chloracrylic acid in an organic solvent is irradiated with the light of a mercury lamp and solid poly-α-chloracrylic acid is obtained. It is isolated, dissolved in water and heated to boiling with the resulting formation of poly-α-oxyacrylic acid, which is obtained in the form of a water-soluble gel. The product so made is dried and subjected to elementary analysis. It is found that it is free from chloride and that approximately two thirds of the carboxyl groups have reacted with hydroxyl groups to intramolecular or intermolecular lactones. The poly-α-oxyacrylic acid so made is soluble in alkali liquors.

This process has been improved and described in Belgian Patent Specification 796 531, Example 1, wherein a blend of 100 g of α-chloracrylic acid, 400 cc of benzene and 1 g of benzoyl peroxide is placed in a round flask provided with an agitator and reflux condenser and heated therein to boiling over a period of 3 hours under nitrogen. The resulting poly-α-chloracrylic acid is separated and dried at 40°C under vacuum. Following this, an aqueous poly-α-chloracrylic acid solution saturated at 30°C is prepared and heated to boiling for 2 hours. Precipitating hydrolyzate is washed until free from chloride and dried at 60°C under vacuum. Poly-α-oxyacrylic acid, of which about one third is lactonized, is obtained in a yield of 77 g or 100 percent of the theoretical, based on the α-chloracrylic acid used.

Poly-α-halogenoacrylic acid (halogen = Cl, Br) is actually easy to produce preparatively by polymerizing α-halogenoacrylic acid in an organic medium, however, by multi-stage operation and with the use of organic solvents, which is too expensive for the production of relatively large quantities of poly-α-oxyacrylic acid. In addition to this, the poly-α-oxyacrylic acid so made is not biodegradable.

German Specification "Offenlegungsschrift" 2 061 584 describes a process for making water-soluble salts of poly-α-oxyacrylic acid, wherein 2.3-dihalogenopropionic acid in aqueous solution, if desired in the presence of radically active catalysts, e.g., potassium peroxo-disulfate-(VI) is heated to boiling for several hours together with basically active agents. This results in the formation of an intermediary product having an unidentified structure, which may contain lactone bonds together with radicals of chemically combined halogen. The intermediary product, which is believed to be formed substantially of poly-α-oxyacrylic acid, is separated, washed and successively dissolved in hot sodium hydroxide solution. Pouring the cooled solution in methanol effects the precipitation of sodium poly-α-oxyacrylate.

This process is, however, not fully satisfactory as it is necessary for it to be carried out with the use of costly 2,3-dibromopropionic acid so as to avoid losses in yield. If less expensive 2,3-dichloropropionic acid is used, it is necessary for it to be used in combination with sodium acetate as the basically active agent so as to obtain poly-α-oxyacrylic acid in acceptable, though distinctly lower yields (cf. comparative working Example 1 hereinafter). If use is made of KOH, the yield decreases even further and considerable quantities of unpolymerizable α-chlorhydracrylic acid are obtained as undesirable by-products (cf. comparative working Example 2 hereinafter). Even though it would be possible by the selection of optimum working conditions to increase the yield of poly-α-oxyacrylic acid, the fact remains that the process described in German Patent Specification "Offenlegungsschrift" 2 061 584 for making water-soluble salts of poly-α-oxyacrylic acid is not satisfactory as it is necessary for the dehydrohalogenation to be effected with the use of equivalent proportions of a base. The base, however, is converted to halide which has to be disposed of. In other words, the production on a relatively large scale entails pollution problems, which considerably affect the economy of the process.

The present invention now provides a process which is free from the disadvantageous phenomena reported hereinabove.

The present invention relates more particularly to a process for making poly-α-oxyacrylic acid by contacting a solution of α-chloracrylic acid with one or more radical-yielding polymerization catalysts, heating and thereby hydrolyzing the resulting poly-α-chloracrylic acid in aqueous solution with the resultant precipitation of solid poly-α-oxyacrylic acid and separating the poly-α-oxyacrylic acid, which process comprises contacting an aqueous α-chloracrylic acid solution with the radical-yielding polymerization catalysts for a period of at least 30 minutes and, while leaving the resulting poly-α-chloracrylic acid unseparated, heating it for a period of at least 1 hour to temperatures within the range 80° and 110°C.

Further preferred features of the present process provide:

a. for light rich in energy to be used as the radical-yielding polymerization catalyst;

b. for potassium peroxo-disulfate-(VI), sodium perborate, azo-bis-isobutyronitrile, benzoyl peroxide, dibenzoyl peroxide or cumene hydroperoxide to be used as the radical-yielding polymerization catalysts in proportions within the range 0.1 and 12 weight percent, based on α-chloracrylic acid;

c. for a redox system comprised of an oxidant and a reductant to be used as the radical-yielding polymerization catalyst in a total proportion within the range 0.1 and 20 weight percent, based on α-chloracrylic acid;

d. for potassium peroxo-disulfate-(VI), sodium perborate, benzoyl peroxide, dibenzoyl peroxide or cumene hydroperoxide to be used as the oxidant, and for sodium dithionite, sodium sulfite, sodium thiosulfate or thioglycolic acid to be used as the reductant;

e. for the aqueous α-chloracrylic acid solution to be used in admixture with between 0.5 and 10 mol percent, based on α-chloracrylic acid, of a thiol, allyl compound or aliphatic halogen compound as a polymerization chain regulator;

f. for the aqueous α-chloracrylic acid solution to be used in admixture with hydrogen chloride as the polymerization chain regulator, and preferably for an α-chloracrylic acid solution in aqueous 10 – 25 weight percent hydrochloric acid to be subjected to polymerization;

g. for the aqueous solution of α-chloracrylic acid having optionally radical-yielding polymerization catalysts dissolved therein to be vigorously stirred for a period of at least 30 minutes;

h. for an aqueous α-chloracrylic acid solution having a radical-yielding polymerization catalyst or a redox system dissolved therein or being exposed to the action of light rich in energy, to be maintained at temperatures within the range 20° and 80°C;

i. for an aqueous α-chloracrylic acid solution containing one of the radical-yielding polymerization catalysts specified under b) above, to be heated to temperatures within the range 80° and 110°C;

j. for the poly-α-chloracrylic acid obtained in aqueous medium to be left unisolated and to be vigorously stirred for a period of at least 1 hour at temperatures within the range 80° and 110°C;

k. for the poly-α-oxyacrylic acid being obtained in solid form on heating the aqueous solution to temperatures within the range 80° and 110°C, to be filtered off, to be scrubbed with water and to be dried under vacuum.

As has been found, it is possible for the complex-forming and lime-sequestering properties of poly-α-oxyacrylic acid to be influenced by the use of various initiators and by the use of the reaction solution in admixture with various addends. In addition to this, poly-α-oxyacrylic acid so produced has unexpectedly been found to be more readily biodegradable, which is advantageous for its use as a builder in detergent compositions.

In those cases in which the polymerization is initiated at 80°C, e.g., with the use of light or a redox system as a radical-yielding polymerization catalyst, it is necessary for the polymerization batch to be successively heated for a period of at least 1 hour to temperatures within the range 80° and 110°C, so as to ensure hydrolysis to poly-α-oxyacrylic acid. If another polymerization catalyst is used as the initiator, it is good practice to start operation at temperatures higher than 80°C, at which poly-α-oxyacrylic acid as the polymerization and hydrolysis product begins to precipitate at once. Here again, it is advantageous for the hydrolysis to be completed by heating the polymerization batch to approximately 100°C, unless this is the starting temperature selected.

To effect the precipitation of poly-α-oxyacrylic acid, it is also advantageous for the α-chloracrylic acid to be polymerized at a pH of less than 2.5. This is a pH-value which α-chloracrylic acid itself does normally not exceed, or which can be established, if necessary, by means of a strong acid, e.g., sulfuric acid, preferably hydrochloric acid.

The materials which can advantageously be added as polymerization regulators to the polymerization batch so as to modify the complexing power and lime-sequestering power of poly-α-oxyacrylic acid, include, for example: thiols (thioglycolic acid, octylmercaptan, dodecylmercaptan); allyl compounds (allyl alcohol, allyl acetate, allyl chloride) or aliphatic halogen compounds (β-chlorpropionic acid, 2,3-dichlorpropionic acid, monochloracetic acid, chloroform, bromoform, carbon tetrachloride, carbon tetrabromide). In clear contrast with the radical-yielding polymerization catalysts, which are "initiators" and for which it is necessary to be present (be it only in the form of light rich in energy), the polymerization regulators influence the chain length of the resulting polymers.

Hydrogen chloride is also an effective polymerization regulator. It is especially advantageous for the polymerization to be effected in hydrochloric acid having a strength approximately of 20 weight percent, rather than in pure water. As an advantageous result of this, hydrogen chloride which is set free during the hydrolysis at about 100°C, is found to escape in vapor form as the reaction medium is practically identical with aqueous azeotropic hydrochloric acid, at that temperature. After removal of poly-α-oxyacrylic acid by filtration, it is possible for the reaction medium to be used for making fresh polymerization batches. In other words, gaseous hydrogen chloride is the only reaction product obtained together with poly-α-oxyacylic acid.

As described in an earlier application, it is possible to produce α-chloracrylic acid from acrylic acid and chlorine which are catalytically freed from gaseous hydrogen chloride. With this in mind, it is possible in accordance with this invention to produce poly-α-oxyacrylic acid from acrylic acid and chlorine in accordance with the following scheme of formulae, without any significant formation of undesirable or useless pollutive by-products:

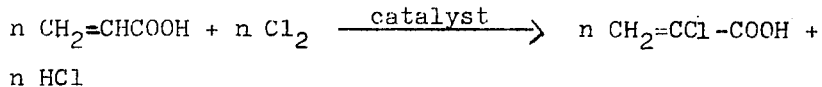

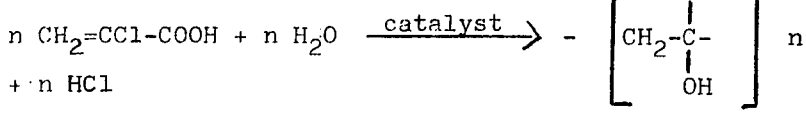

sum:

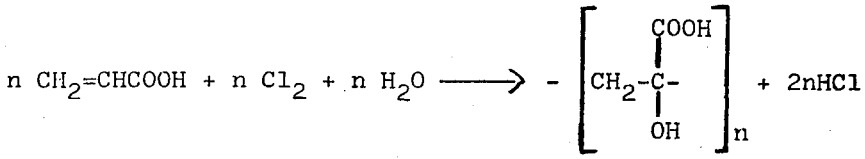

In those cases in which the polymerization, more particularly the hydrolysis, is effected with vigorous agitation, the resulting poly-α-oxyacrylic acid is obtained in finely pulverulent and readily filterable form. Agitation can be extensively replaced by boiling the batch at temperatures within the range 100° and 110°C, whereby the liquid is kept in motion.

After filtration and washing, it is possible for poly-α-oxyacrylic acid to be reacted with equivalent quantities of a base and to be converted to its salt, which preferably is the sodium salt. It can, however, also be converted to its potassium and ammonium salts.

Depending on the particular manner in which the polymerization is effected, the resulting poly-α-oxyacrylic acid has a complexing power for calcium within the range 100 and 150 mg Ca/g. This was determined potentiometrically with the use of a calcium-sensitive electrode. The overall power for sequestering lime, which includes the value determined for the complexing power, lies between 160 and 320 mg Ca/g. This was determined by subjecting poly-α-oxyacrylic acid in an aqueous sodium carbonate solution having a pH of 10 to titration with a 0.05N calcium acetate solution until turbidity caused by $CaCO_3$ was noticed.

The relative viscosity, which is an index of the degree of polymerization, was determined in each particular case on a 1 weight percent solution of poly-α-oxyacrylic acid in 2N-NaOH at 20°C, with the use of an Ostwald viscosimeter.

The yields were calculated on the basis of a degree of lactonization of two thirds.

COMPARATIVE EXAMPLE 1:

(cf. German Patent Specification No. 2 061 584; use of 2,3-dichloropropionic acid)

286 g (2 mols) of 2,3-dichloropropionic acid in 700 cc of water and 164 g (2 mols) of anhydrous sodium acetate were heated to boiling in a 2 liter flask. As the mass could not be found after 1 hour to have been rendered turbid by polymerization products, there was added 5 cc of a 1.5 weight percent aqueous solution of potassium peroxo-disulfate-(VI) $K_2S_2O_8$. This effected the formation of a precipitate, the volume of which could not be increased by boiling over 2 hours with the addition of a further 25 cc of a 1.5 weight percent $K_2S_2O_8$-solution. The whole was kept at boiling temperature for a further 1 hour and precipitated insoluble polymer was filtered off. The poly-α-oxyacrylic acid so obtained was scrubbed first with water and then with acetone, and dried. The yield was 98 g or 63 mol percent.

| Complexing power for Ca: | 78 mg Ca/g |
| Power for sequestering lime: | 171 mg Ca/g |

A 1 weight percent solution in 2N NaOH had a relative viscosity of 0.1, at 20°C.

COMPARATIVE EXAMPLE 2:

(Formation of α-chlorhydracrylic acid during the dehydrochlorination of 2,3-dichloropropionic acid with potassium hydroxide in aqueous solution)

143 g (1 mol) of 2,3-dichloropropionic acid and 200 g of water were placed in a 2 liter flask provided with an agitator and a solution of 112 g of KOH (2 mols) in 400 g of water was added dropwise thereto, at 30°C. After all had been added, the mass had a pH of 7.3, which was reduced to 2.5 by means of a mixture of 55 g of concentrated sulfuric acid and 100 g of water. Analysis indicated that the solution contained 34.8 g (approximately 1 gram atom) of chloride ions. 0.5 g of $K_2S_2O_8$ was added and polymerization occurred at once at 80° – 85°C with the resultant formation of a precipitate. To ensure that the polymerization was complete, there was added twice after 1 hour 1 g of $K_2S_2O_8$ and the whole was stirred, each time for 3 hours at 80° – 90°C. After cooling, the precipitate was suction-filtered, washed with water and acetone and dried.

Poly-α-oxyacrylic acid was obtained in a yield of 21 g or 27.5 percent of the theoretical.

The filtrate was extracted five times, each time with 100 cc of ethyl acetate, the extracts were collected and dried with $MgSO_4$. After evaporation, there was obtained 25 g (20 percent of the theoretical) of α-chlorhydracrylic acid in the form of a clear viscous solution. Molecular weight (determined by titration):
Calc.: 124.5
Found: 126.5

The IR-spectrum was identical with that of a comparative specimen of α-chlorhydracrylic acid.

The above Example shows that the treatment of 2,3-dichloropropionic acid with KOH produces desirable α-chloracrylic acid together with considerable quantities of α-chlorhydracrylic acid which is per se not polymerizable. As this is a strongly hydrophilic acid, the extraction is certainly not complete so that larger quantities than indicated are very likely to be formed.

EXAMPLE 1:

(Polymerization by light)

500 g of α-chloracrylic acid in 2.7 l water was exposed at room temperature to the direct action of sunlight, over a period of altogether 48 hours. A clear transparent jelly was obtained, which was introduced with vigorous agitation into 1 liter of boiling water and the whole was kept boiling for a further 2 hours. A finely pulverulent hydrolyzate was obtained, which was filtered off, washed with 1 liter of water and dried overnight at 60°C under vacuum. The yield was 356 g or 98 mol%.

| Complexing power for Ca: | 101 mg Ca/g |
| Power for seguestering line: | 252 mg Ca/g |

A 1 weight percent solution in 2N NaOH had a relative viscosity of 0.41, at 20°C.

The sodium salt was prepared by reacting 25 g of poly-α-oxyacrylic acid with 25 g of a 50 weight percent sodium hydroxide solution and by evaporating the water in excess.

EXAMPLE 2:

(Polymerization by means of a redox system comprised of $K_2S_2O_8/Na_2S_2O_4$)

300 g of α-chloracrylic acid and 30 g of $K_2S_2O_8$ were dissolved at 30°C in 3 l of water and a solution of 19.5 g of sodium dithionite $Na_2S_2O_4$ in 100 cc of water was dropped thereto within 1 hour at that temperature.

After a further 1 hour, the batch was brought to boiling temperature with vigorous agitation and kept for 2 hours. Precipitated poly-α-oxyacrylic acid was filtered off, washed three times, each time with 1 liter of water and dried at 60° C under vacuum. The yield was 188 g or 86 mol percent.

| | |
|---|---|
| Complexing power for Ca: | 121 mg Ca/g |
| Power for sequestering lime: | 303 mg Ca/g |

The relative viscosity was 0.25.
The sodium salt was made in the manner described in Example 1.

EXAMPLE 3:

(Polymerization by means of a redox system comprised of $K_2S_2O_8$/thioglycolic acid)

213 g (2 mols) of α-chloracrylic acid, 2.13 g of $K_2S_2O_8$ and 5.3 g of an 80 weight percent thioglycolic acid in 2.2 l of water were stirred over 4 hours at 30°C and the whole was kept then at a temperature within the range 95° and 101°C for 3 hours with vigorous agitation. The resulting finely pulverulent poly-α-oxyacrylic acid was filtered off, washed twice, each time with 1 liter of water and dried at 60°C under vacuum. The yield was 127 g or 81 mol percent.

| | |
|---|---|
| Complexing power for Ca: | 128 mg Ca/g |
| Power for sequestering lime: | 275 mg Ca/g |

The relative viscosity was 0.20.
The sodium salt was made in the manner described in Example 1.

EXAMPLE 4:

(Polymerization in the presence of allyl alcohol as a polymerization regulator).

213 g (2 mols) of α-chloracrylic acid, 2.13 g of $K_2S_2O_8$ and 10.65 g of allyl alcohol were dissolved in 2 l of water, heated to boiling with vigorous agitation and kept at boiling temperature over a period of 2 hours. Precipitated poly-α-oxyacrylic acid was filtered off, washed twice, each time with 1 liter of water and dried at 60°C under vacuum. The yield was 132 g or 85 mol percent.

| | |
|---|---|
| Complexing power for Ca: | 142 mg Ca/g |
| Power for sequestering lime: | 308 mg Ca/g |

The relative viscosity was 0.37.
The sodium salt was made in the manner described in Example 1.

EXAMPLE 5:

(Polymerization in the presence of β-chloropropionic acid as a polymerization regulator).

488 g of α-chloracrylic acid and 12 g of β-chloropropionic acid in 900 cc of water were heated to 80°C and mixed with 7 g of $K_2S_2O_8$ with vigorous agitation. After 15 minutes, the whole was admixed with vigorous agitation with a solution of 13 g of $K_2S_2O_8$ in 30 cc of water, which was added dropwise within 6 hours. Following this, the whole was heated to boiling for 1 hour with agitation. Precipitated poly-α-oxyacrylic acid was filtered off, washed twice, each time with 1 liter of water and dried at 60°C under vacuum. The yield was 365 g or 99 mol percent.

| | |
|---|---|
| Complexing power for Ca: | 107 mg Ca/g |
| Power for sequestering lime: | 292 mg Ca/g. |

The relative viscosity was 0.29.
The sodium salt was made in manner described in Example 1.

EXAMPLE 6:

(Polymerization in a 20 weight percent hydrochloric acid as a polymerization regulator)

106.5 g (1 mol) of α-chloracrylic acid was dissolved in 1260 cc of a 20 weight percent aqueous hydrochloric acid and the whole was heated to 80°C with agitation. 1.1 g of azo-bis-isobutyronitrile was added, the whole was kept at the temperature indicated over a period of 1.5 hours and then heated to temperatures within the range 100° and 105°C for 4 hours with agitation. Hydrogen chloride which was set free during the reaction, was delivered to a water-cooled reflux condenser and removed in gas form. Precipitated poly-α-oxyacrylic acid was filtered off, washed three times, each time with 500 cc of water and dried at 60°C under vacuum. The yield was 77 g or 99 mol percent.

| | |
|---|---|
| Complexing power for CA: | 120 mg Ca/g |
| Power for sequestering lime: | 160 mg Ca/g. |

The relative viscosity was 0.19.
The sodium salt was made in the manner described in Example 1.

EXAMPLE 7:

(Polymerization in a 20 weight percent hydrochloric acid as a polymerization regulator with recycle of reaction medium).

163 g of α-chloracrylic acid was dissolved in 2000 cc of an about 20 weight percent aqueous hydrochloric acid (this being acid used twice as a polymerization medium) and the whole was heated to 80°C with agitation. Following this, 0.8 g of azo-bis-isobutyronitrile was added twice, in 1 hour intervals. After a further 1 hour, the whole was heated to boiling (108°C) and kept at that temperature for 4 hours with agitation. Hydrogen chloride which was set free during the reaction, was delivered to a water-cooled reflux condenser and removed in gas form. Precipitated poly-α-oxyacrylic acid was filtered off, washed twice, each time with 500 cc of water and dried at 60°C under vacuum. The yield was 105 g or 88 mol percent.

| | |
|---|---|
| Complexing power for Ca: | 110 mg Ca/g |
| Power for sequestering lime: | 242 mg Ca/g. |

The relative viscosity was 0.15.

The sodium salt was made in the manner described in Example 1.

EXAMPLE 8:

(Biodegradability)

The biodegradability of poly-α-oxyacrylic acid was determined in a Warburg apparatus. The degradability in percent is expressed by the ratio of biologic oxygen demand to chemical oxygen demand.

Product I was made by polymerizing α-chloracrylic acid in benzene and by subjecting the resulting poly-α-chloracrylic acid to aqueous hydrolysis, in the manner described in Example 1 of Belgian Patent Specification No. 796 531.

Product II was made in accordance with Example 3 of the present invention.

| Product | Biodegradability |
|---------|------------------|
| I       | <5 %             |
| II      | approx. 30 %     |

We claim:

1. In a process for making poly-α-oxyacrylic acid by contacting a solution of α-chloracrylic acid with radical-yielding polymerization catalysts, heating and thereby hydrolyzing the resulting poly-α-chloracrylic acid in aqueous solution with the resultant precipitation of solid poly-α-oxyacrylic acid and separating the poly-α-oxyacrylic acid, the improvement which comprises contacting an aqueous α-chloracrylic acid solution with the radical-yielding polymerization catalysts for a period of at least 30 minutes and, while leaving the resulting poly-α-chloracrylic acid unseparated, heating it for a period of at least 1 hour to temperatures within the range 80° and 110°C.

2. A process as claimed in claim 1, wherein light rich in energy is used as the radical-yielding polymerization catalyst.

3. A process as claimed in claim 1, wherein a substance selected from the group consisting of potassium peroxo-disulfate-(VI), sodium perborate, azo-bis-isobutyronitrile, benzoyl peroxide, dibenzoyl peroxide and cumene hydroperoxide is used as the radical-yielding polymerization catalyst in proportions within the range 0.1 and 12 weight percent, based on α-chloracrylic acid.

4. A process as claimed in claim 1, wherein a redox system comprised of an oxidant and a reductant is used as the radical-yielding polymerization catalyst in a total proportion within the range 0.1 and 20 weight percent, based on α-chloracrylic acid.

5. A process as claimed in claim 4, wherein the oxidant is a member selected from the group consisting of potassium peroxo-disulfate-(VI), sodium perborate, benzoyl peroxide, dibenzoyl peroxide and cumene hydroperoxide, and the reductant is a member selected from the group consisting of sodium dithionite, sodium sulfite, sodium thiosulfate and thioglycolic acid.

6. A process as claimed in claim 1, wherein the aqueous α-chloracrylic acid solution is used in admixture with between 0.5 and 10 mol percent, based on α-chloracrylic acid, of a member selected from the group consisting of thiols, allyl compounds and aliphatic halogen compounds as polymerization chain regulators.

7. A process as claimed in claim 1, wherein the aqueous α-chloracrylic acid solution is used in admixture with hydrogen chloride as the polymerization chain regulator.

8. A process as claimed in claim 1, wherein the aqueous α-chloracrylic acid solution is used in admixture with hydrogen chloride as the polymerization chain regulator, the solution subjected to polymerization being an α-chloracrylic acid solution in aqueous 10 – 25 weight percent hydrochloric acid.

9. A process as claimed in claim 1, wherein the aqueous solution of α-chloracrylic acid is vigorously stirred for at least 30 minutes.

10. A process as claimed in claim 1, wherein the aqueous α-chloracrylic acid solution having radical-yielding polymerization catalysts dissolved therein is vigorously stirred for a period of at least 30 minutes.

11. A process as claimed in claim 1, wherein the aqueous α-chloracrylic acid solution having a radical-yielding polymerization catalyst or a redox system dissolved therein or being exposed to the action of light rich in energy, is maintained at temperatures within the range 20° and 80°C.

12. A process as claimed in claim 1, wherein an aqueous α-chloracrylic acid solution containing one of the radical-yielding polymerization catalysts as claimed in claim 3, is heated to temperatures within the range 80° and 110°C.

13. A process as claimed in claim 1, wherein the poly-α-chloracrylic acid obtained in aqueous medium is left unisolated and vigorously stirred for a period of at least 1 hour at temperatures within the range 80° and 110°C.

14. A process as claimed in claim 1, wherein the poly-α-oxyacrylic acid being obtained in solid form on heating the aqueous solution to temperatures within the range 80° and 110°C, is filtered off, scrubbed with water and dried under vacuum.

* * * * *

Notice of Adverse Decision in Interference

In Interference No. 99,521, involving Patent No. 3,890,288, W. Vogt, E. Fischer and E. Auer, PROCESS FOR MAKING POLY-ALPHA-OXY-ACRYLIC ACID AND ITS ALKALI METAL SALTS, final judgment adverse to the patentees was rendered Aug. 5, 1977, as to claims 1, 3, 11 and 12.

[*Official Gazette December 20, 1977.*]